W. N. BOOTH.
TRAILER DRAFT CONNECTION.
APPLICATION FILED FEB. 20, 1919.

1,327,265.

Patented Jan. 6, 1920.

Inventor
William N. Booth

By Whittemore Hulbert & Whittemore
Attorneys

UNITED STATES PATENT OFFICE.

WILLIAM N. BOOTH, OF DETROIT, MICHIGAN.

TRAILER DRAFT CONNECTION.

1,327,265.  Specification of Letters Patent.  Patented Jan. 6, 1920.

Original application filed July 23, 1917, Serial No. 182,178. Divided and this application filed February 20, 1919. Serial No. 278,281.

*To all whom it may concern:*

Be it known that I, WILLIAM N. BOOTH, a citizen of the United States of America, residing at Detroit, in the county of Wayne and State of Michigan, have invented certain new and useful Improvements in Trailer Draft Connections, of which the following is a specification, reference being had therein to the accompanying drawings.

The invention relates to trailer draft connections and has for its main object the provision of a construction in which the universal coupling between the members attached to the motor vehicle and trailer comprises a ball and socket in permanent engagement with each other. Other objects of the invention reside in the novel arrangements and combinations of parts as more fully hereinafter set forth.

The present application is a division of my prior application Serial No. 182,178, filed July 23, 1917, for "trailer draft connection for motor vehicles."

Figure 1:
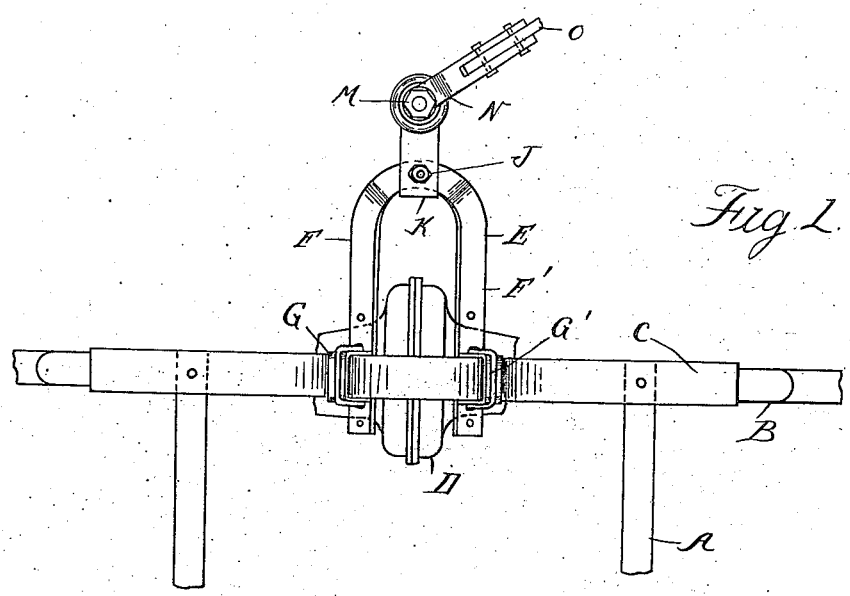
Figure 1 is a plan view of a portion of the frame of the car, showing my improved draft connection applied thereto.
Figure 2:
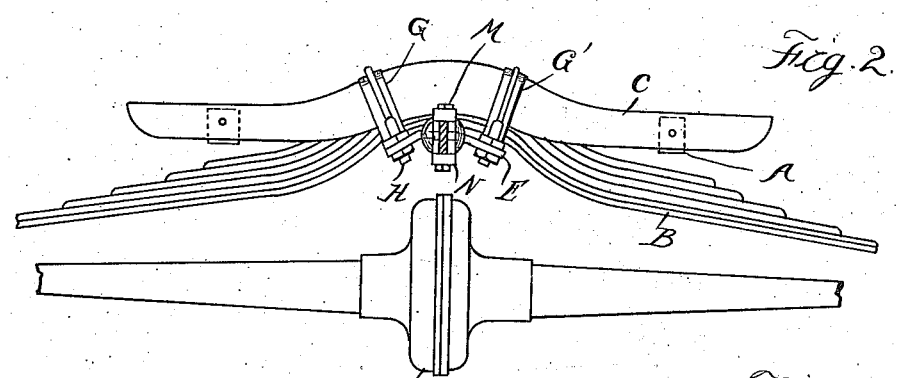
Fig. 2 is a rear elevation of Fig. 1.
Figure 3:
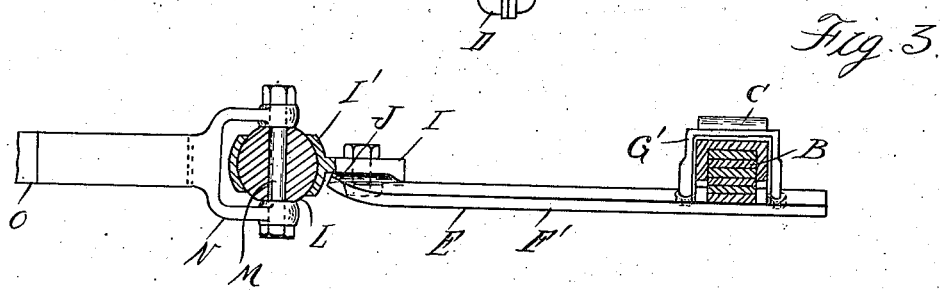
Fig. 3 is a longitudinal section partly in elevation of the draft connection.

A is the frame of the motor vehicle and is supported upon the rear axle by a laterally-extending spring B clipped to the rear cross bar C of the frame, said spring and cross bar being upwardly bowed to provide clearance for the enlargement D of the axle which contains the differential. My improved draft connection is applied to this structure at the point of connection between the spring B and cross bar C and preferably by substituting it for the clip plates. As shown, E is a metallic U-shaped strap having its parallel portions F and F' spaced to correspond with the spacing of the clips G and G' securing the cross bar C to the spring B. The bars F and F' are apertured for the passage of these clips, preferably with a plurality of apertures permitting of adjustment of the strap longitudinally into different positions. Thus, when the clip clamping bolts H are tightened, the strap E will be securely fastened to the frame.

The rear end of the strap E has attached thereto a universal coupling, preferably comprising a member I secured by the bolts J to the strap and having a lug K engaging the inner edge of the strap to carry the draft stress thereinto. The member I is provided with a spherical socket I' in which is arranged a ball L centrally apertured for the passage of a bolt M. This bolt serves to secure to the ball a bifurcated draft bar N, which latter is secured in any suitable manner to the pole or tongue O of the trailer.

With the construction as described the strap E and fitting I will be located at a point centrally in rear of the vehicle and in a position free from interference with other parts. To attach or detach the trailer it is only necessary to disengage the bolt M, which permits of engaging or removing the bifurcated draft arm N. In the coupled position the arm N is free to pivot universally in relation to the fitting I so as to compensate for both vertical and lateral oscillations of the spring, as well as to permit of turning the motor vehicle. The draft stress is carried directly into the frame of the motor vehicle, which is of sufficient strength to take care of the same and thus injury to any part of the vehicle is avoided.

From the above description it will be readily seen that by having the universal coupling formed of the spherical socket I' in permanent engagement with the ball L, the contacting surfaces between the socket and ball can be lubricated and will not collect dust or dirt as would be the case if they were detached from each other. Moreover, the engagement between the ball and socket being permanent, a comparatively close fitting can be secured and rattling of the parts will be avoided. Furthermore, the detachable engagement between the trailer draft bar and the ball being a clamping connection, the parts are also free from rattle and permit of quick attachment and detachment. Still another important consideration is that the construction can be comparatively cheaply manufactured.

What I claim as my invention is:

1. A trailer draft connection, comprising a member for connection with the tractor, a member attachable to the trailer, and a universal coupling between said members comprising a ball and socket in permanent engagement with each other, the socket member being attached to one of the members of said draft connection and the ball having a detachable engagement with the other of said members.

2. A trailer draft connection, comprising two members respectively attachable to the tractor and the trailer, a universal coupling between said members comprising a ball and a socket in permanent engagement with each other, means for attaching the socket member to one of said first-mentioned members, a bifurcation on the other of said members for embracing the ball, and means for detachably clamping said bifurcation to said ball.

3. A trailer draft connection, comprising a U-shaped member having its furcations engageable with the rear cross-spring of a tractor and constituting clip-plates therefor, a member attachable to the draft bar of the trailer, and a universal coupling comprising a ball and socket in permanent engagement, the socket member being centrally attached to said U-shaped member, and a pin for clamping the trailer draft member to said ball member.

In testimony whereof I affix my signature.

WILLIAM N. BOOTH.